(12) United States Patent
Morrow

(10) Patent No.: US 10,836,415 B1
(45) Date of Patent: Nov. 17, 2020

(54) MULTIFUNCTIONAL FLAT CART

(71) Applicant: Erick Morrow, Murfreesboro, TN (US)

(72) Inventor: Erick Morrow, Murfreesboro, TN (US)

( * ) Notice: Subject to any disclaimer, the term of this patent is extended or adjusted under 35 U.S.C. 154(b) by 0 days.

(21) Appl. No.: 16/375,427

(22) Filed: Apr. 4, 2019

(51) Int. Cl.
*B62B 1/00* (2006.01)
*B62B 1/10* (2006.01)

(52) U.S. Cl.
CPC ............ *B62B 1/10* (2013.01); *B62B 2206/00* (2013.01)

(58) Field of Classification Search
CPC .. B62B 3/008; B62B 1/22; B62B 1/20; B62B 1/206; B62B 1/18
See application file for complete search history.

(56) References Cited

U.S. PATENT DOCUMENTS

| | | | | |
|---|---|---|---|---|
| 306,813 A * | 10/1884 | Gray | .......................... | B62B 1/18 280/47.31 |
| 324,606 A * | 8/1885 | Stoll | .......................... | B62B 1/00 280/47.16 |
| 689,932 A * | 12/1901 | Tucker | ....................... | B62B 1/18 280/47.31 |
| 1,038,197 A * | 9/1912 | Raddatz | ..................... | B62B 1/18 280/47.31 |
| 2,235,042 A * | 3/1941 | Ronning | .................... | B62B 1/18 280/47.11 |
| 3,870,367 A * | 3/1975 | O'Brien | ..................... | B62B 1/20 298/1 B |
| 4,261,590 A * | 4/1981 | Schupbach | ............... | B62B 1/18 280/47.31 |
| 4,758,010 A * | 7/1988 | Christie | .................. | B62B 1/206 280/47.18 |
| 5,433,462 A * | 7/1995 | Groleau | .................. | B62B 1/208 280/38 |
| 5,620,193 A * | 4/1997 | Dschaak | ................... | B62B 1/22 280/47.31 |
| 6,128,852 A * | 10/2000 | Hansen | .................. | A01G 20/30 47/32 |
| 6,213,532 B1 * | 4/2001 | Dunyon | .................... | B62B 1/20 280/47.3 |
| 6,764,093 B2 * | 7/2004 | Allsop | .................... | B62B 1/147 220/9.4 |
| 7,950,687 B2 * | 5/2011 | Ludlow | ..................... | B62B 1/20 280/43.11 |
| 9,456,598 B1 * | 10/2016 | Nelson | .................. | A01M 31/02 |
| 10,046,781 B2 * | 8/2018 | Dumas | .................... | B62B 1/202 |

(Continued)

*Primary Examiner* — Hau V Phan
(74) *Attorney, Agent, or Firm* — Patterson Intellectual Property Law, P.C.; Alex H. Huffstutter

(57) ABSTRACT

A multipurpose cart is provided herein. The multipurpose cart includes a substantially flat main support frame, a wheel support frame, at least one wheel, and a tarp selectively connectable to the main support frame. The wheel support frame extends from an end of the main support frame and is inclined upwardly relative to a topside of the main support frame. The wheel support frame includes an axle that is spaced apart from an underside of the main support frame by an offset distance. The at least one wheel is rotatably connected to the axle and has a radius substantially equal to the offset distance. The tarp is configurable in an open position to rest on a majority of the cart. The tarp includes reinforcement straps connected to a lower surface of the tarp and further includes at least one retainer for selectively connected the tarp to the cart.

8 Claims, 14 Drawing Sheets

(56) References Cited

U.S. PATENT DOCUMENTS

| | | | |
|---|---|---|---|
| 2009/0179393 A1* | 7/2009 | Ludlow | B62B 1/20 280/47.31 |
| 2010/0044125 A1* | 2/2010 | Witzigman | A01M 31/006 180/19.3 |
| 2011/0101649 A1* | 5/2011 | Harding | B62B 3/008 280/651 |
| 2012/0248721 A1* | 10/2012 | Dean | B62B 1/22 280/47.31 |
| 2014/0131963 A1* | 5/2014 | Bengtzen | A45B 23/00 280/32 |
| 2015/0083776 A1* | 3/2015 | Lim | A61B 17/07207 227/175.1 |

* cited by examiner

MULTIFUNCTIONAL FLAT CART

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

1. Field of the Invention

The present disclosure relates generally to wheeled carts. More particularly, the present disclosure pertains to a multifunctional flat cart for transporting tools, materials, and debris.

2. Description of the Prior Art

Wheeled carts, such as wheelbarrows, flat carts, dollies, and the like are used regularly by construction workers and the general population around the world. They are particularly common on construction or job sites.

Many contractors and construction workers use wheelbarrows to haul their tools, materials, and debris to and from job sites. Wheelbarrows tend to work well for some of these items but due to the tub-shaped compartment of the wheelbarrow, they tend to have major limitations with bulky goods such as lumber, large equipment and larger sheet goods such as plywood.

Loading a wheelbarrow with anything tends to be a hassle due to the unstable leg configuration and elevated tub shaped compartment. Wheelbarrows tend to fall over when not loaded correctly (e.g., not loading them from the backside and/or not setting the items in slowly and softly).

In general, the shape of a wheelbarrow is extremely bulky, which causes them to take up a lot of space in work vehicles while in transport between job sites. This size issue causes many contractors to strap them to roof tops and ladder racks. Such activity by contractors and construction works has a plethora of safety concerns, not only for themselves but for that of the other drivers around them.

Wheelbarrows commonly have a narrow tire width that ranges from 3 to 4 inches with a height of 12 to 13 inches making them hard to control and maneuver on a job site's ever-changing terrain. This is especially true when the wheelbarrow is under a heavy load.

Other, not so popular options include single wheeled flat carts, traditional platform carts, or even wagons. None of the options provides solutions to all of the problems associated with "wheelbarrows." Single wheeled flat carts cannot haul loose debris well due to the fact that they do not have sides. Single wheel flat carts also feature unstable legs similar to those of wheelbarrows. Platform carts typically have four wheels which makes them more stable, however, they may be bulkier than wheelbarrows. Platform carts typically do not have sides which makes them a bad option for carrying loose debris. Wagons have similar problems to that of platform carts. They are also not typically built to withstand the tough environment of a construction site.

BRIEF SUMMARY

Accordingly, there is a need for a new hauling cart design. A new cart is disclosed herein. The cart is a new material, equipment and debris hauler with more hauling options and fewer limitations than wheelbarrows and other traditional flat carts. The cart features a stable loading surface due to the fact that it does not have legs which tend to make the loading surface unstable. The cart lays flat or flush to the ground due to the wheel(s) being offset above the loading surface, which makes loading from any side easy and stable. A user can drop and throw items or debris onto the loading surface or tarp portion without worrying about the cart tipping or falling over.

The cart may be made of aluminum to reduce weight and take advantage of aluminums' weather resistant properties. The cart has rubber hand grips for comfort so that the user will have a non-slip surface to grab. The cart may have a 6.5" wide×16" tall flat free tire(s) for years of worry-free use and increased maneuverability through a job site's ever-changing terrain. The cart's loading surface is substantially flat for loading of all sorts of bulky shaped tools, equipment, and materials, even including 4'×8' sheet goods.

The cart has a built-in UV, water & tear resistant tarp with polyester webbing sewn to the underside for support. The tarp may be 6'×6' in size. The tarp features handle grab loops and an added rope for cinching corners together around loose debris. The tarp portion folds up and stores away in a storage compartment hidden under a hinged door of the cart. The hinged door doubles as at least a portion of the loading surface. While the tarp is in an open position, the hinged door lays open and flat on an upper portion of the frame of the cart. In a cinched positioned, the tarp may provide better hauling capabilities than wheelbarrows and other traditional flat carts.

The tarp may feature a quick release system for separating it from the cart so that it can be used alone for other job site tasks and/or be replaced when and if necessary.

The cart has a tire shroud positioned between the wheel and the loading surface that extends over a top of the wheel. The tire shroud serves three purposes for the cart. The tire shroud is vertical enough to help hold bulky goods and materials from sliding off the front of the cart but is angled enough to allow the tarp portion when in the open position to lay substantially flat for loading debris evenly across the tarp and still support the tarp in a cinched position or closed position. A top portion of the shroud ensures that anything being hauled using the cart does not come in contact with the wheel.

Due to the fact that the cart is designed to lay flat, it advantageously takes up less space in work vehicles, thus allowing contractors to stack tools, equipment & materials on it, safely and securely, while driving between job sites. In other words, the cart is less bulky than wheelbarrows and other traditional flat carts.

The cart is also simple to use. To transport items and debris safely with cart, a user simply bends at the knees, grabs the rubber grip handles, and lifts with the legs until standing fully erect. The user may then walk forward and push the cart to a desired location. To set cart down, either loaded or unloaded, the user simply bends at the knees until the cart rests evenly on a surface. To unload debris from a cinched tarp of the cart, the user un-cinches the tarp and pick up the handles to allow most of the debris to fall off the cart. The user may then remove any remaining debris by pushing down on one handle while raising the other handle to tip the cart to one side or the other. Alternatively, simple unloading of the tarp can be accomplished manually by hand.

According to one aspect of the present disclosure, there is provided a cart comprised of a frame and at least one wheel. The frame includes a generally planar main frame portion and a wheel support frame. The generally planar main frame portion has an underside. The wheel support frame portion extends from the main frame portion. The wheel support frame portion is inclined upwardly relative to the main frame portion. The wheel support frame portion includes an axle offset from the underside of the main frame portion by an offset distance defined normal to a lower plane of the underside of the main frame portion. The at least one wheel is rotatably connected to the axle. The at least one wheel has a radius substantially equal to the offset distance.

According to another aspect of the cart of the present disclosure, the at least one wheel may be in contact with a ground surface when the underside of the main frame portion rests on the ground surface.

According to another aspect of the cart of the present disclosure, the at least one wheel may have a flat free tire configured to maintain the radius under load.

According to another aspect of the cart of the present disclosure, the at least one wheel may have a combined width of at least 25% of a width of the main frame portion.

According to another aspect of the cart of the present disclosure, the cart may further include an upper plate connected to the main frame portion proximate to a topside of the main frame portion. The upper plate may selectively positionable along a portion of a length of the main frame portion.

According to another aspect of the cart of the present disclosure, the upper plate is configurable in a first position to cover a storage compartment of the main frame portion and is configurable in a second position adjacent to the storage compartment.

According to another aspect of the cart of the present disclosure, the upper plate may include a latch configured to maintain the upper plate in a selected one of the first position or the second position.

According to another aspect of the cart of the present disclosure, the cart may further include a lower plate connected to the main frame portion proximate to the underside of the main frame portion. The lower plate may be configured to at least in part define a storage compartment within the main frame portion above the lower plate.

According to another aspect of the cart of the present disclosure, the cart may further include a tarp connected to the lower plate. The tarp may be configured in a folded configuration to be stored in the storage compartment and may be configured in an open configuration to cover a majority of the cart.

According to another aspect of the cart of the present disclosure, the wheel support frame portion may include a first sloped surface that extends from a topside of the main frame portion along a rearward portion of the wheel support frame portion.

According to another aspect of the cart of the present disclosure, the wheel support frame may further include a second sloped surface that extends from an upper end of the first sloped surface over the at least one wheel.

According to another aspect of the cart of the present disclosure, the cart may further include a pair of handles that extend from a topside of the main frame portion opposite the wheel support frame portion. The pair of handles may be parallel to and spaced apart from the lower plane of the underside of the main frame portion by a thickness of the main frame portion.

According to further aspects of the present disclosure, there is provided a multipurpose cart. The multipurpose cart is comprised of a substantially flat main support frame, a wheel support frame, at least one wheel, and a tarp. The substantially flat main support frame has a topside. The wheel support frame extends from the main support frame and inclined upwardly relative to the main support frame. The wheel support frame includes at least one surface that extends along a rearward portion of the wheel support frame proximate to the main support frame and over an upper portion of the wheel support frame. The at least one wheel is rotatably connected to the wheel support frame. The tarp is selectively connectable to the main support frame. The tarp is configurable in an open position to rest on at least a portion of the topside of the main support frame and to rest on at least a portion of the at least one surface of the wheel support frame.

According to another aspect of the multipurpose cart of the present disclosure, the at least one surface of the wheel support frame may include a first sloped surface and a second sloped surface connected to the first sloped surface. The first sloped surface may extend from the topside of the main support frame along the rearward portion of the wheel support frame. The second sloped surface may extend along the upper portion of the wheel support frame.

According to another aspect of the multipurpose cart of the present disclosure, the tarp may be configured to rest on at least a portion of each of the first and second sloped surfaces of the wheel support frame in the open position.

According to another aspect of the multipurpose cart of the present disclosure, the main support frame may further include a first side rail and a second side rail spaced apart from the first side rail. The first and second side rails may at least partially define the topside of the main support frame.

According to another aspect of the multipurpose cart of the present disclosure, the main support frame may include a lower plate connected between the first and second side rails. The lower plate may span a portion of a length of the main support frame. The lower plate, the first side rail, and the second side rail may be configured to at least partially define a storage compartment of the main support frame. The storage compartment may be positioned above the lower plate between the first and second side rails.

According to another aspect of the multipurpose cart of the present disclosure, the tarp may be connectable to the lower plate. The tarp may be configurable in a folded position to be stored in the storage compartment.

According to another aspect of the multipurpose cart of the present disclosure, the tarp may include at least one retainer extending from a bottom side of the tarp. The at least one retainer may be connected to the lower plate using at least one opening defined through the lower plate.

According to another aspect of the multipurpose cart of the present disclosure, the at least one retainer may be located proximate to a center of the tarp such that the center of the tarp is located centrally within the storage compartment when installed.

According to another aspect of the multipurpose cart of the present disclosure, the main support frame may further include an upper plate pivotally connected to the topside of the main support frame adjacent to a storage compartment of the main support frame. The upper plate may be configurable in either a first position or a second position to at least partially define an upper surface. The upper plate in the first position lays flat along a portion of the topside of the main support frame covering the storage compartment. The upper plate in the second position lays flat along a portion of the topside of the main support frame adjacent to the storage compartment.

According to another aspect of the multipurpose cart of the present disclosure, the tarp may be configurable in a folded position when the upper plate is in the first position.

The tarp may be further configurable in the open position to rest on at least a portion of the upper surface of the upper plate when the upper plate is in the second position.

According to another aspect of the multipurpose cart of the present disclosure, the multipurpose cart may further include a pair of handles that extend from the topside of the main support frame opposite the wheel support frame. The pair of handles may be positioned parallel to the topside of the main support frame.

According to still further aspects of the present disclosure, there is provided a reinforced tarp for connecting to a cart. The reinforced tarp is comprised of a generally square main support material, one or more reinforcement straps, and one or more retainers. The generally square main support material has a lower surface. The one or more reinforcement straps are connected to the lower surface. The one or more retainers are connected to the one or more reinforcement straps near a center of the main support material for selectively connecting the main support material to the cart.

According to another aspect of the reinforced tarp of the present disclosure, the one or more reinforcement straps may include a first reinforcement strap and a second reinforcement strap. The first reinforcement strap may be connected between a first pair of opposite corners of the main support material and the second reinforcement strap may be connected between a second pair of opposite corners of the main support material. Each of the first and second reinforcement straps may have a loop at each end proximate to a respective corner of the main support material.

According to another aspect of the reinforced tarp of the present disclosure, the reinforced tarp may further include a tie rope. The tie rope may extend from a selected loop of one of the first reinforcement strap or the second reinforcement strap. The tie rope may be configured to pass through all of the remaining loops of the first and second reinforcement straps for cinching the main support material into a closed position.

According to another aspect of the reinforced tarp of the present disclosure, the main support material may include a plurality of straight sides defined between adjacent corners of the main support material. Each straight side of the plurality of straight sides may include a handle slot positioned midway between the adjacent corners of the main support material.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 7:
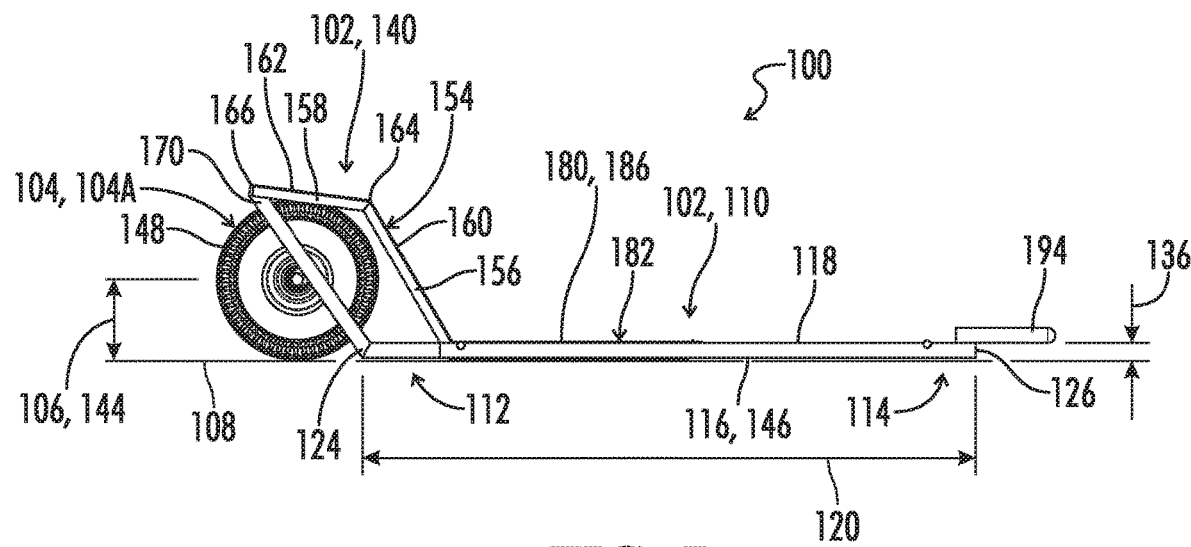
FIG. 7 illustrates a side elevation view of the cart of FIG. 1 in accordance with the present disclosure.
Figure 8:
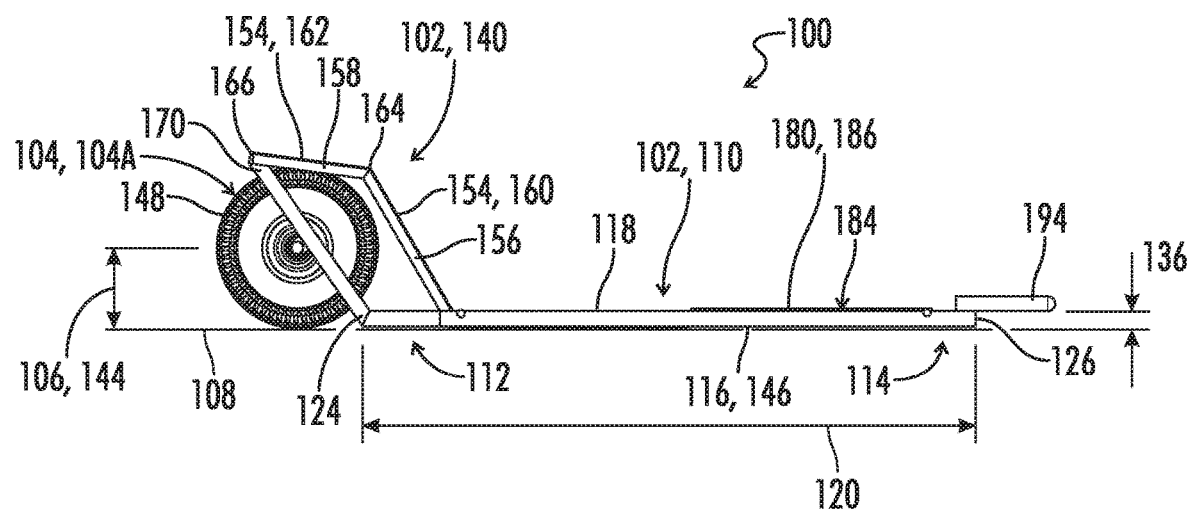
FIG. 8 illustrates a side elevation view of the cart of FIG. 2 in accordance with the present disclosure.

Referring to FIGS. 1-13, a cart 100 is provided. The cart 100 may also be referred to herein as a multipurpose cart 100. The cart 100 includes a frame 102 and at least one wheel 104 which has a radius 106 (Shown in FIGS. 7 and 8). The frame 102 and the at least one wheel 104 are configured to be supported by a ground surface 108. The ground surface 108 may also be referred to herein as an external support surface 108.

The frame 102 is generally constructed from square steel or aluminum tube, which is welded together. In other embodiments, the frame 102 may be made from a different material such as wood, an alloy, plastic, or the like. Additionally, in other embodiments, the frame 102 may be solid or may be made from a different type of tubing such as pipe, channel, angle, or the like. The frame 102 of the cart 100 includes a generally planar (e.g., substantially flat) main frame portion 110 and a wheel support frame portion 140. The main frame portion 110 may also be referred to herein as a main support frame 110. The wheel support frame portion 140 may also be referred to herein as a wheel support frame 140.

Figure 9:
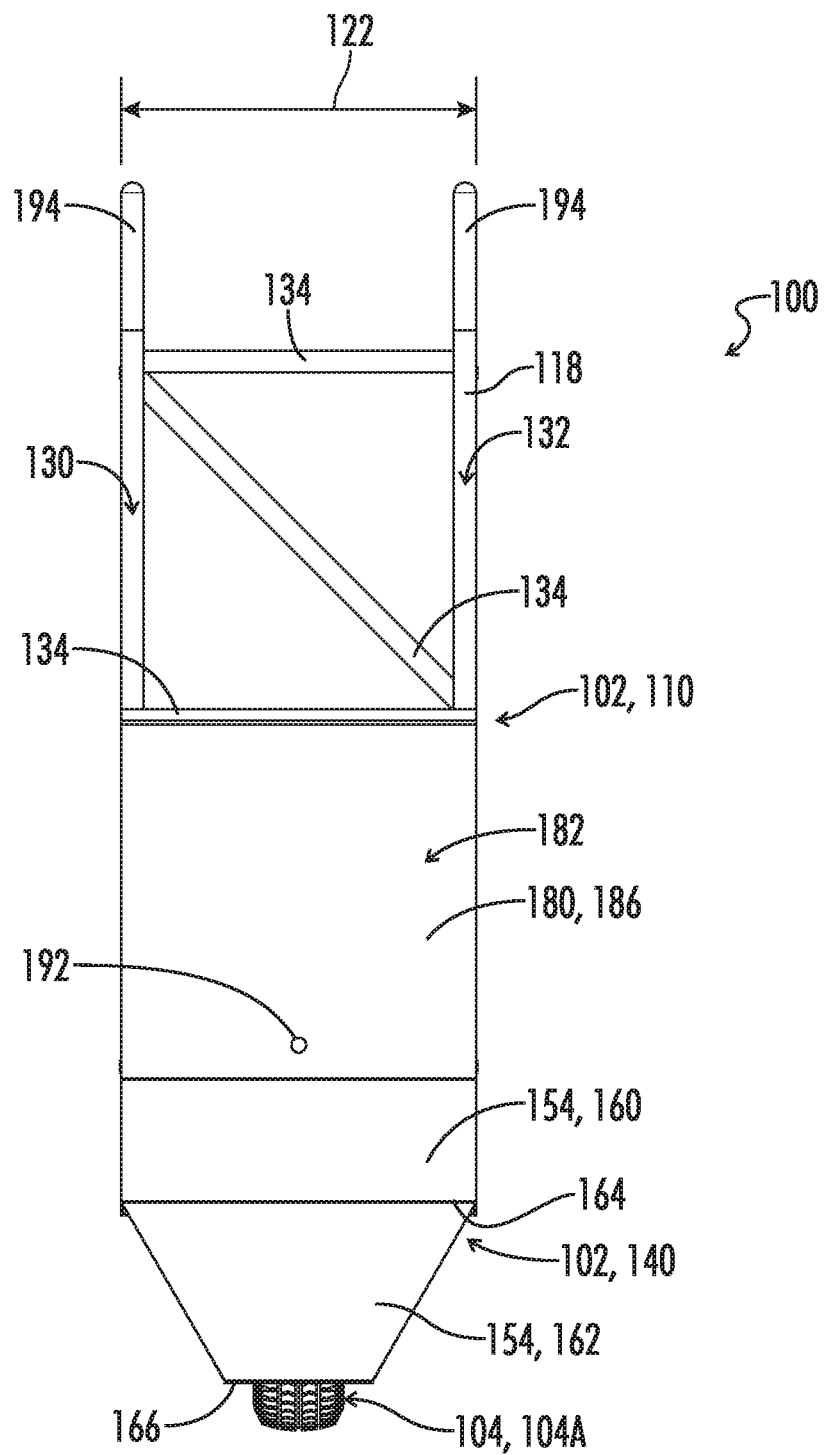
FIG. 9 illustrates a top plan view of the cart of FIG. 1 in accordance with the present disclosure.
Figure 10:
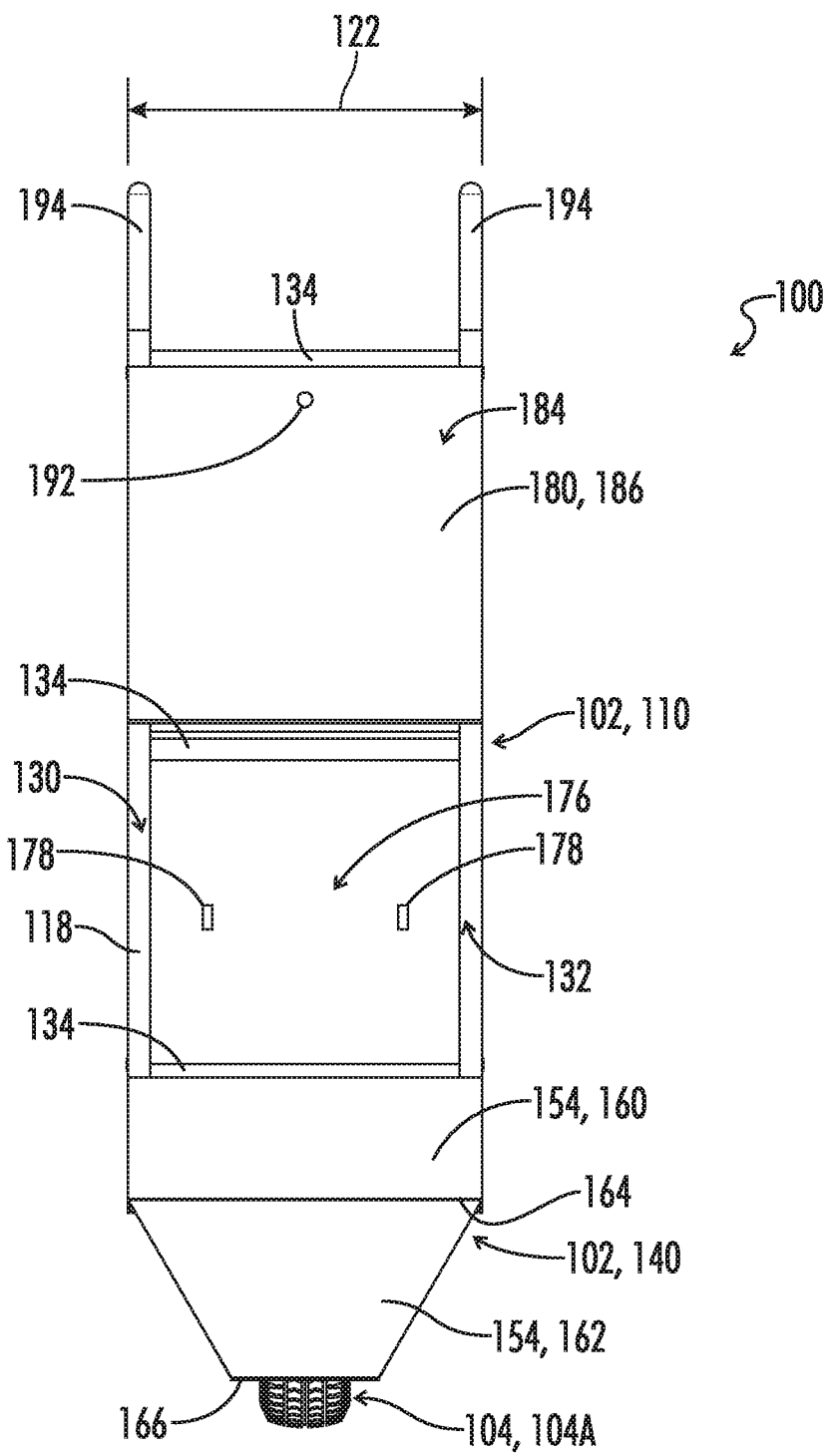
FIG. 10 illustrates a top plan view of the cart FIG. 2 in accordance with the present disclosure.
Figure 11:
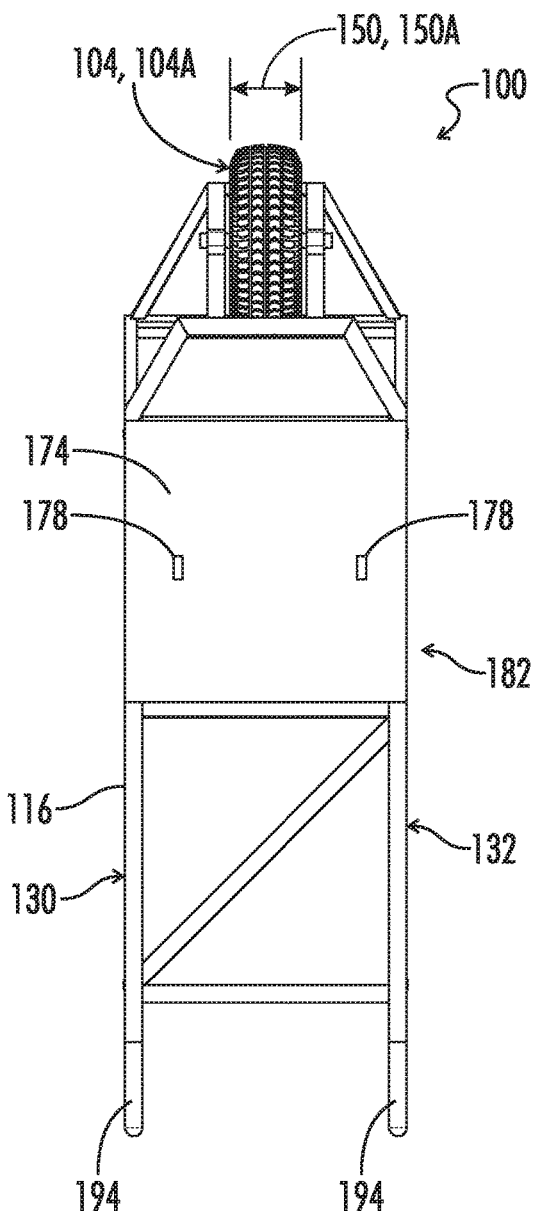
FIG. 11 illustrates a bottom plan view of the cart FIG. 1 in accordance with the present disclosure.
Figure 12:
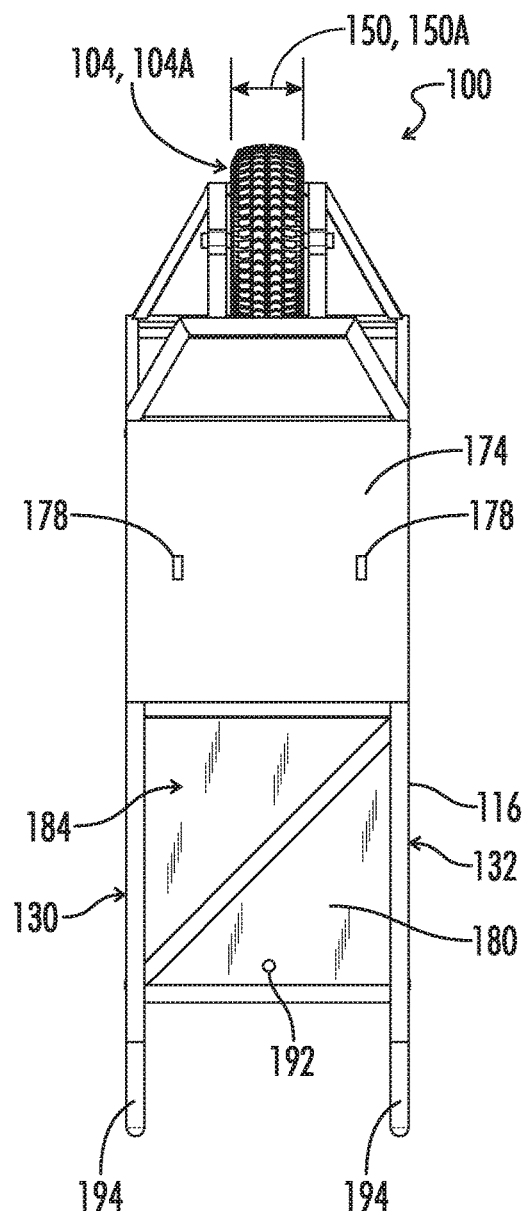
FIG. 12 illustrates a bottom plan view of the cart FIG. 2 in accordance with the present disclosure.

The main support frame 110 includes a front end portion 112, a rear end portion 114, an underside 116 (Shown in FIGS. 1, 7-8, and 11-12), and a topside 118 (Shown in FIGS. 1-2, 4-5, and 7-10). The main support frame 110 has a length 120 (FIGS. 7 and 8) and a width 122 (FIGS. 9 and 10). The length 120 of the main support frame 110 is defined between a front edge 124 of the front end portion 112 and a rear edge 126 of the rear end portion 114.

The main support frame 110 may further include a first side rail 130 and a second side rail 132. Each of the first and second side rails 130, 132 has an outer edge that is spaced apart by the width 122 of the main support frame 110. The first and second side rails 130, 132 span a majority of the length 120 of the main support frame. Each of the first and second side rails 130, 132 may at least partially define the topside 118 of the main support frame 110.

The main support frame 110 may further include a plurality of lateral supports 134 extending between the first side rail 130 and the second side rail 132. The plurality of lateral supports 134 may be positioned normal or angled relative to the first and second side rails 130, 132. The underside 116 of the main support frame 110 may at least partially be defined by the first side rail 130, the second side rail 132, and the plurality of lateral supports 134. The topside 118 of the main support frame 110 may at least partially be defined by the first side rail 130, the second side rail 132, and the plurality of lateral supports 134.

The first and second side rails 130, 132, as well as the plurality of lateral supports 134, may at least partially defined a thickness 136 of the main support frame 110. The thickness 136 is generally defined between the underside 116 and the topside 118 of the main support frame 110. The thickness 136 of the main support frame 110 may be generally uniform along the length 120 of the main support 110.

The wheel support frame 140 extends from the main support frame 110 and is inclined upwardly relative to the main support frame 110. The wheel support frame 140 may be connected to the front end portion 112 of the main support frame 110. The wheel support frame 140 may include an axle 142 that is offset from the underside 116 of the main support frame 110 by an offset distance 144. The offset distance 144 is defined normal to a lower plane 146 which is defined by the underside 116 of the main support frame 110.

Figure 16:
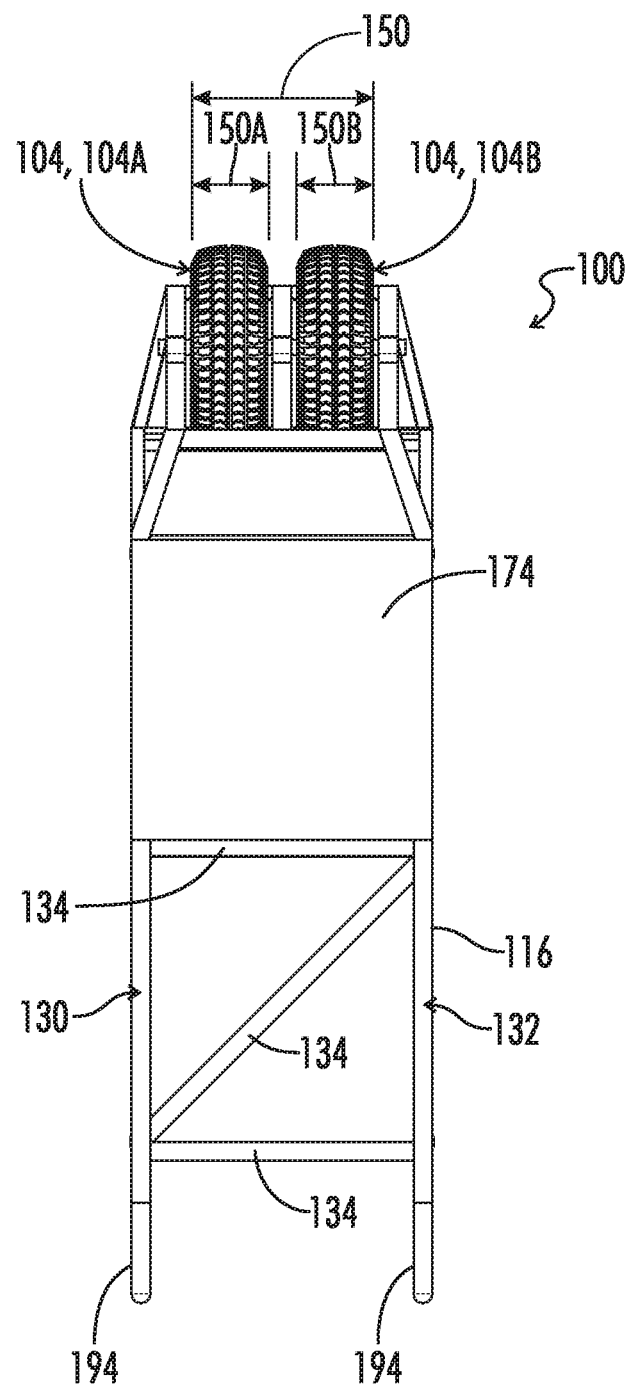
FIG. 16 illustrates a bottom plan view of the cart of FIG. 15 in accordance with the present disclosure.

The radius 106 of the at least wheel 104 may be substantially equal to the offset distance 144. By "substantially equal" it is meant that the radius 106 is within 80% to 120% of the offset distance 144; preferably within 90% to 110% of the offset distance 144; and most preferably equal to the offset distance 144. Accordingly, and as can best be seen in FIGS. 7 and 8, the at least one wheel 104 is in contact with the ground surface 108 when the underside 116 of the main support frame 110 rests on the ground surface 108. The at least one wheel 104 may have a flat free tire 148 (FIGS. 7 and 8) that is configured to maintain the radius 144 consistently, even under a load. As can best be seen in FIGS. 11, 12 and 16, in order to provide greater stability to the cart 100, a combined width 150 of the at least one wheel 104 may be at least 25% of the width 122 of the main support frame 110.

Figure 15:
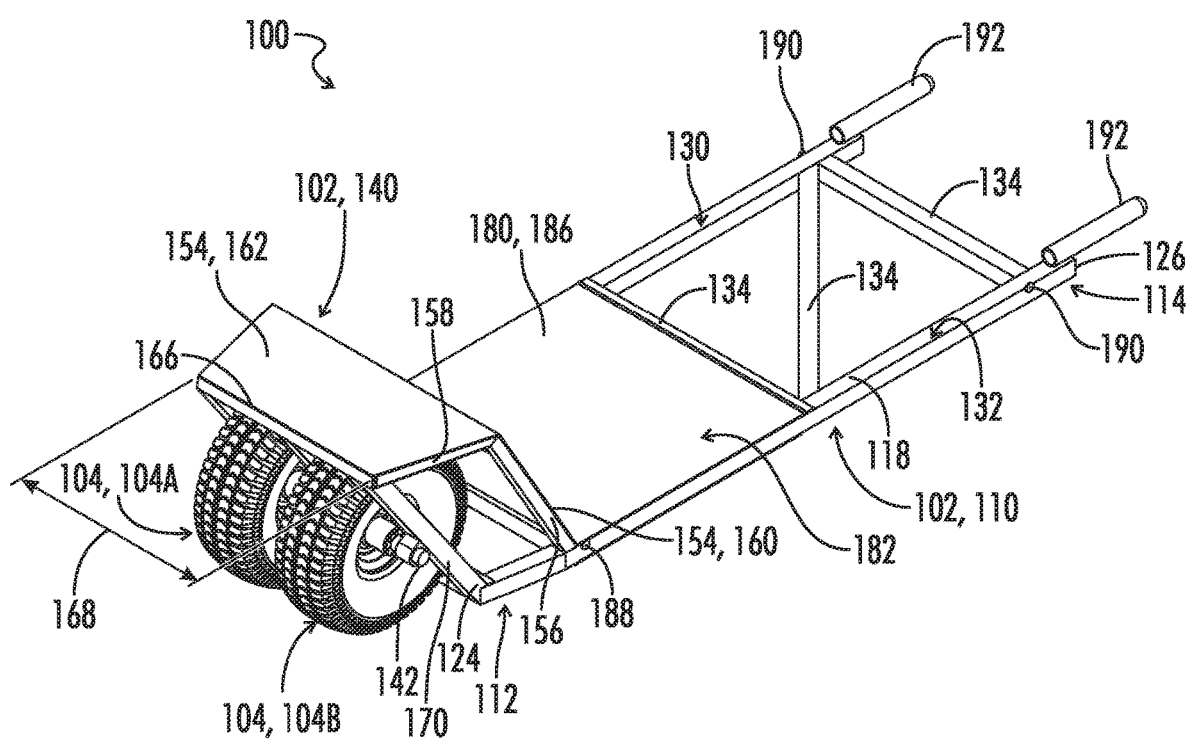
FIG. 15 illustrates a front perspective view of a cart having two wheels and an upper plate in a first position in accordance with the present disclosure.

As can best be seen in FIGS. 1-13, the at least one wheel 104 may include only a first wheel 104A. The first wheel 104A may have a first wheel width 150A. As can best be seen in FIGS. 15 and 16, the at least one wheel 104 may include the first wheel 104A and a second wheel 104B. The second wheel 104B may have a second wheel width 150B. The combined width 150 of the at least one wheel 150 may be a summation of the first wheel width 150A and the second wheel width 150B.

As can best be seen in FIGS. 1-2, 4-5, and 7-10, the wheel support frame 140 may include at least one surface 154 extending along a rearward portion 156 of the wheel support frame 140 proximate to the main support frame 110 and over an upper portion 158 of the wheel support frame 140.

The at least one surface 154 of the wheel support frame 140 includes a first sloped surface 160 and a second sloped surface 162. The first sloped surface 160 may cover the rearward portion 156 of the wheel support frame 140. And the second sloped surface 162 may cover the upper portion 158 of the wheel support frame 140. The first sloped surface 160 has a steeper incline relative to the lower plane 146 than the second sloped surface 162.

The first sloped surface 160 may extend from the topside 118 of the main support frame 110. The first sloped surface 160 may have a generally consistent width that is substantially equal to the width 122 of the main support frame 110. The second sloped surface 162 may extend from an upper end 164 of the first sloped surface 160 over the at least one wheel 104.

The second sloped surface 162 may have a forward end 166 that is defined distal relative to the upper end 164 of the first sloped surface 160. The forward end 166 has a forward end width 168 (Shown in FIGS. 1 and 15). The forward end width 168 may be at least as wide as the combined width 150 of the at least one wheel 104. The second sloped surface 162 may taper from a width that is substantially equal to the width 122 of the main support frame 110 at a location proximate to the upper end 164 of the first sloped surface 160 to the forward end width 168. As illustrated, the width of the second sloped surface tapers linearly between the width at the upper end 164 of the first sloped surface 160 and the forward end width 168. In other embodiments (not shown), the width may taper nonlinearly (e.g., convex or concave) or may not taper at all.

In other embodiments (not shown), the at least one surface 154 of the wheel support frame 140 may be a single curved surface that covers the rearward portion 156 and the upper portion 158 of the wheel support frame 140. This embodiment may or may not include a tapering width.

As can best be seen in FIGS. 4-5, 7-8 and 15, the wheel support frame 140 may include a forward portion 170 connected between the forward end 166 of the second sloped surface 162 (e.g., a forward end of the upper portion 158) and the front edge 124 of the main support frame 110. The rearward portion 156 may be connected to the topside 118 of the main support frame 110 spaced apart from the front edge 124. The forward portion 124 may support the axle 142 and the at least one wheel 104.

The main support frame 110 may include a lower plate 174 connected to the main support frame 110 proximate to the underside 116 of the main support frame 110. The lower plate 174 may be connected to the underside 116 of the main support frame 110. As illustrated, the lower plate 174 is connected to portions of the bottom sides of the first and second side rails 130, 132. In other embodiments (not shown), the lower plate 174 may be connected in between the first and second side rails 130, 132 (i.e., between inner sides) and may be flush with the underside 116 of the main support frame 110. The lower plate is configured to span a portion of the length 120 of the main support frame 110. In certain embodiments, the lower plane 146 may be defined by the lower plate 174 when it is attached to the underside 116 of the main support frame 110.

The lower plate 174 may at least partially defines a storage compartment 176 within the main support frame 110 above the lower plate 174. The storage compartment 176 may further be defined by the first and second side rails 130, 132.

The main support frame 110 may further include an upper plate 180. The upper plate 180 may be connected to the topside 118 of the main support frame 110 and may be positionable along a portion of the length 120 of the main support frame 110. The upper plate 180 may be configured in a first position 182 to cover the storage compartment 176. The upper plate 180 may also be configured in a second position 184 adjacent to the storage compartment 176. The upper plate 180, when configured in either the first position 182 or the second position 184, may lay flat along the topside 118 of the main support frame 110 to at least partially define an upper surface 186 of the main support frame 110.

The upper plate 180 may be pivotally connected to the topside 118 of the main support frame 110. The pivotal connection to the topside 118 of the main support frame 110 may be along an edge of the storage compartment 176 such that the upper plate 180 may either be configured in the first position 182 or the second position 184.

In other embodiments (not shown), the upper plate 180 may be slidably connected to the topside 118 of the main support frame 110 such that the upper plate 180 may slide between the first position 182 and the second position 184.

As can best be seen in FIGS. 1-2, 4-5, and 15, the main support frame 110 may include a pair of forward tabs 188 and a pair of rearward tabs 190. The pairs of forward and rearward tabs 188, 190 extend slightly above the topside 118 of the main support frame 110. The pair of forward tabs 188 are positioned nearer to the front edge 124 of the main support frame 110 than to the pivotal connection between the upper plate 180 and the topside 118 of the main support frame 110. The pair of forward tabs 188 are configured to keep the upper plate 180 from shifting laterally when in the first position 182. The pair of rearward tabs 190 are positioned nearer to the rear edge 126 of the main support frame 110 than to the pivotal connection between the upper plate 180 and the topside 118 of the main support frame 110. The pair of rearward tabs 190 are configured to keep the upper plate 180 from shifting laterally when in the second position 184.

As illustrated, the upper plate 180 incldues a hole 192 for aiding a user in repositioning the upper plate 180 between the first position 182 and the second position 184. In certain embodiments (not shown), the upper plate 180 or the main support body 110 may include a latch connected thereto and configured to maintain the upper plate 180 in a selected one of the first position 182 or the second position 184.

The cart 100 may further include a pair of handles 194194. The pair of handles 194 are connected to and extend from the topside 118 of the main support frame 110. The pair of handles 194 may be connected to the rear end portion 114 of the of the main support frame 110 opposite the wheel support frame. Each handle of the pair of handles 194 may be connected to a different one of the first and second side rails 130, 132 and may be parallel to the first and second side rails 130, 132. The pair of handles 194 may be parallel to and spaced apart from the lower plane 146 of the underside 116 of the main support frame 116 by the thickness 136 of the main support frame 110.

The pair of handles 194 may be formed from cylindrical steel or aluminum tubing, rather than the square tubing used for constructing the frame 102. Each handle of the pair of handles may include a rubber covering (not shown). The rubber covering may increase safety during use by increasing friction between the handles and a user's hands (not shown). In some embodiments (not shown), the rubber covering may be a coating, such as that used on spray-on truck bedliners. In other embodiments (not shown), the pair of handles 194 may include a pattern etched thereon to provide similar benefits as the rubber covering.

Figure 14:
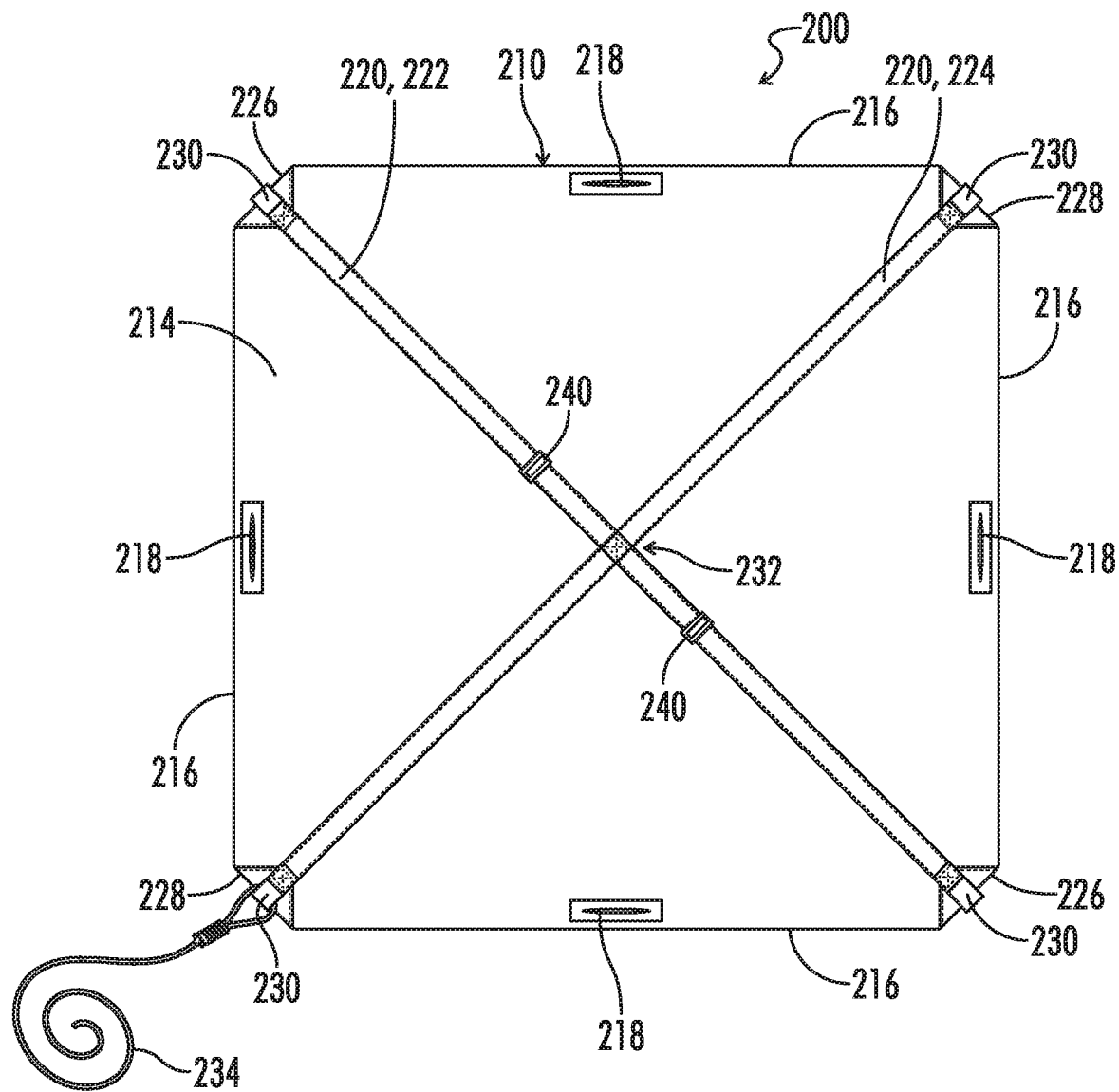
FIG. 14 illustrates a bottom plan view of a tarp in accordance with the present disclosure.

Referring to FIG. 14, a tarp 200 is provided. The tarp 200 may include a generally square main support material 210, one or more reinforcement straps 220, and one or more retainers 240 connected to the one or more reinforcement straps 220. The tarp 200 may also be referred to herein as a reinforced tarp 200. The generally square main support material 210 may also be referred to herein as a main support material 210. The main support material 210 may be shaped differently in other embodiments, such as rectangular, circular, or some other geometric shape.

The main support material 210 of the tarp 200 has an upper surface 212 (FIG. 3), a lower surface 214, and a plurality of straight sides 216. As illustrated the main support material 210 has four straight sides and four corners. The corners of the tarp may be folded under. Each straight side of the plurality of straight sides 216 may include a handle slot 218 positioned midway between adjacent corners of the main support material 210.

In certain embodiments (not shown), each handle slots 218 that is shown positioned midway between adjacent corners may be repositioned at any location, adjacent to the respective straight side 216, between adjacent corners of the main support material 210. In other embodiments (not shown), multiple handle slots may be defined between adjacent corners of the main support material 210.

The one or more reinforcement straps 220 may be connected to the lower surface 210 using thread, glue, or any other means for securely attaching the one or more reinforcement straps 220 to the lower surface 210 of the tarp 200. As illustrated, the one or more reinforcement straps 220 may include a first reinforcement strap 222 and a second reinforcement strap 224. The first reinforcement strap 222 may be connected between a first pair of opposite corners 226 of the main support material 210 and the second reinforcement strap 224 may be connected between a second pair of opposite corners 228 of the main support material 210. Each end of the first and second reinforcement straps 222, 224, respectively, is configured to form a loop 230 proximate to a respective corner of the first and second pairs of opposite corners 226, 228. The first and second reinforcement straps 222, 224 intersect along the lower surface 210 proximate to a center 232 of the main support material 210.

Figure 13:
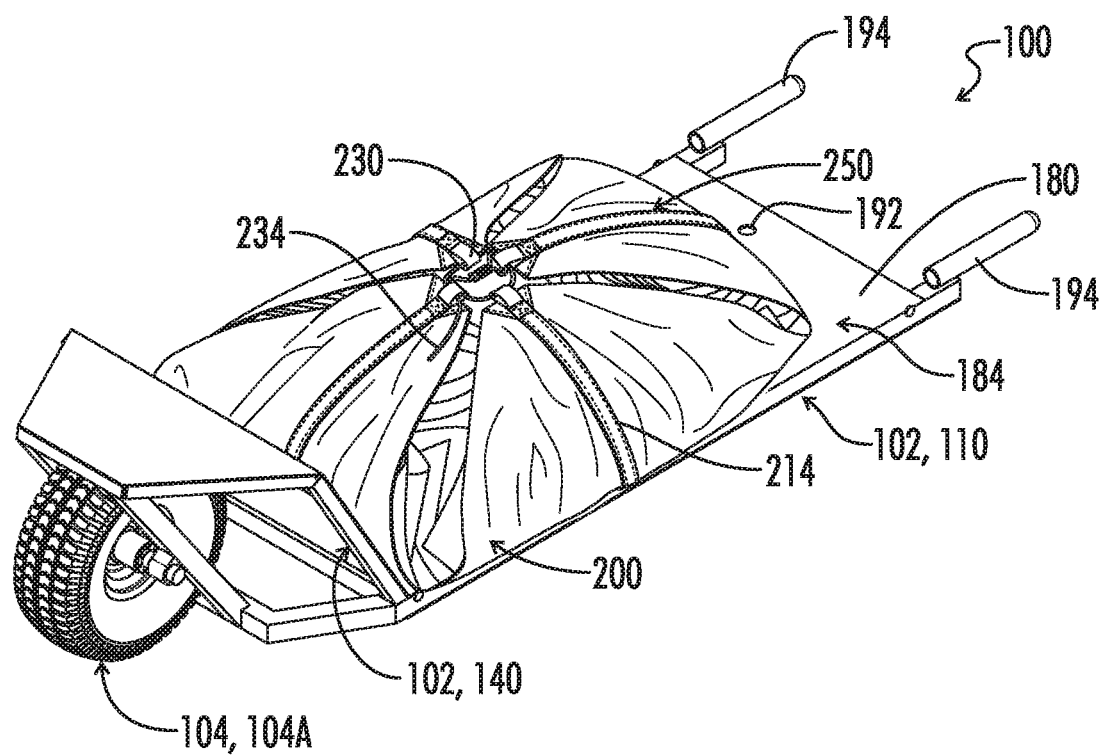
FIG. 13 illustrates a rear perspective view of the cart of FIG. 2 with a tarp of the cart in a closed configuration in accordance with the present disclosure.

The tarp 200 may include a tie rope 234 extending from a selected loop of the first and second reinforcement straps 222, 224. The tie rope 234 is configured to pass through the remaining loops of the first and second reinforcement straps 222, 224 for cinching the main support material 210 of the tarp 200 into a closed configuration 250 (FIG. 13). The closed configuration 250 may also be referred to herein as a closed position 250, a cinched configuration 250, or a cinched position 250. Although not shown, the tie rope 234 may also pass through the handle slots 218 that may be positioned along the plurality of straight sides 216 of the main support material 210.

As can best be seen in FIG. 14, the one or more retainers 240 may be connected to the one or more reinforcement straps 220 near the center 232 of the main support material 210. The one or more retainers 240 are configured to enable the tarp 200 to selectively attach to the cart 100. Although the one or more retainers 240 are illustrated as slip buckles, the one or more retainers may be different in other embodiments such as magnets or some other connection means for attaching the main support material 210 of the tarp 200 to the cart 100.

Figure 1:
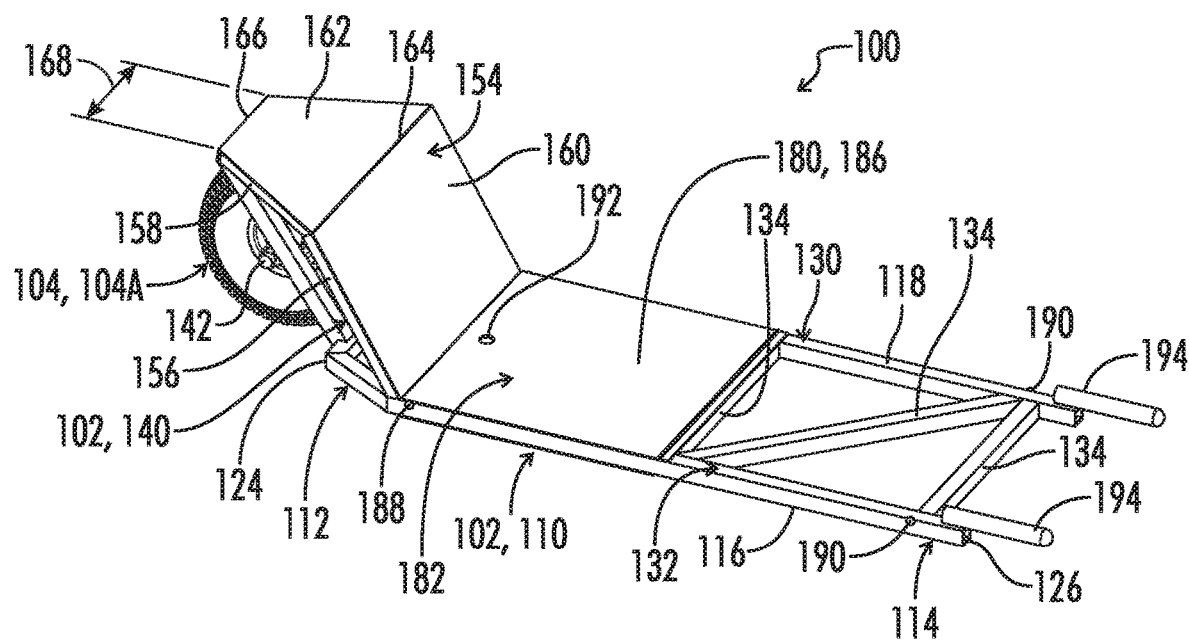
FIG. 1 illustrates a rear perspective view of a cart having a single wheel and an upper plate in a first position in accordance with the present disclosure.
Figure 2:
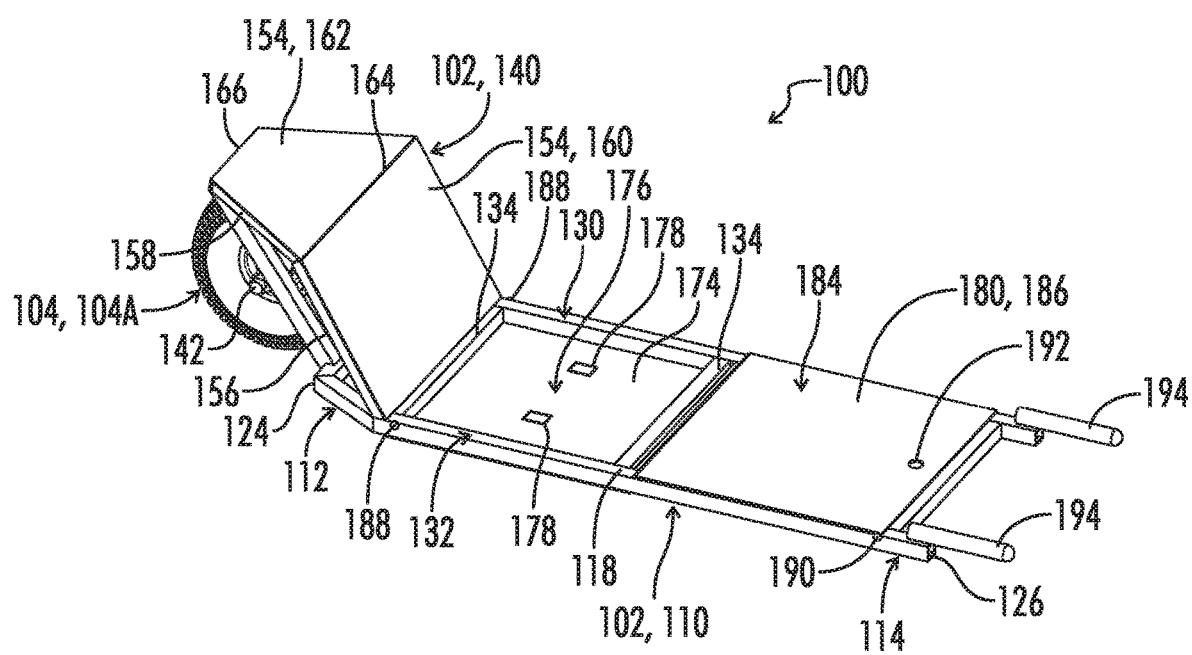
FIG. 2 illustrates a rear perspective view of the cart of FIG. 1 with the upper plate in a second position in accordance with the present disclosure.
Figure 3:
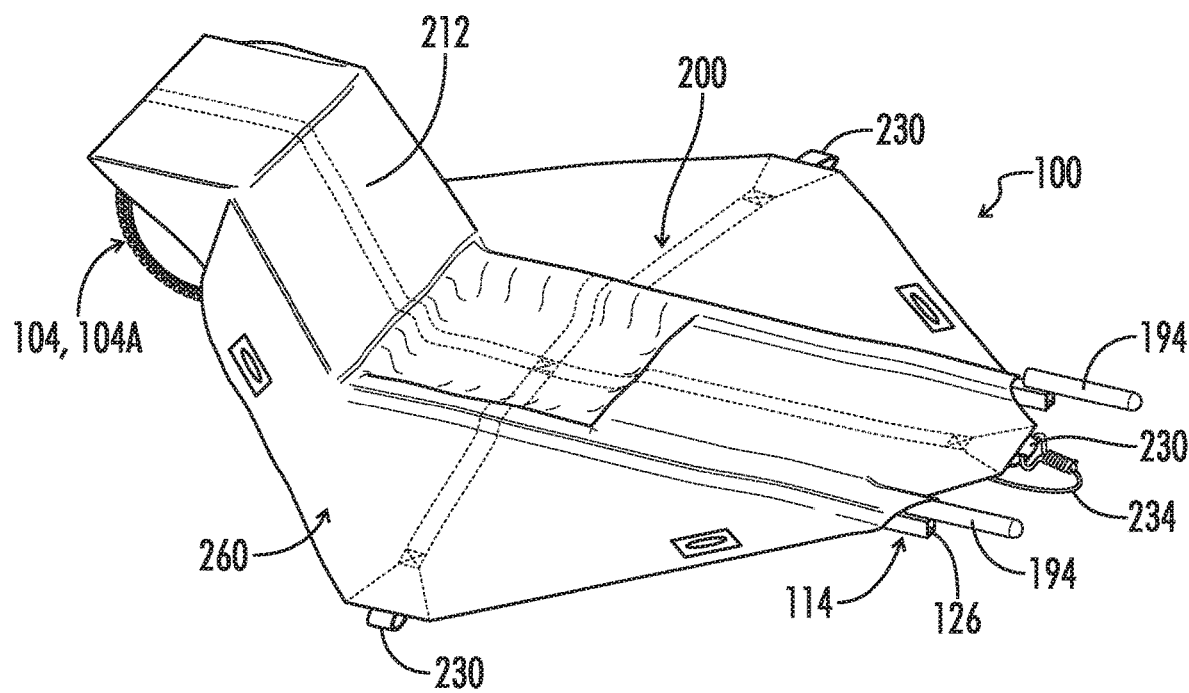
FIG. 3 illustrates a rear perspective view of the cart of FIG. 2 with a tarp of the cart in an open configuration in accordance with the present disclosure.
Figure 4:
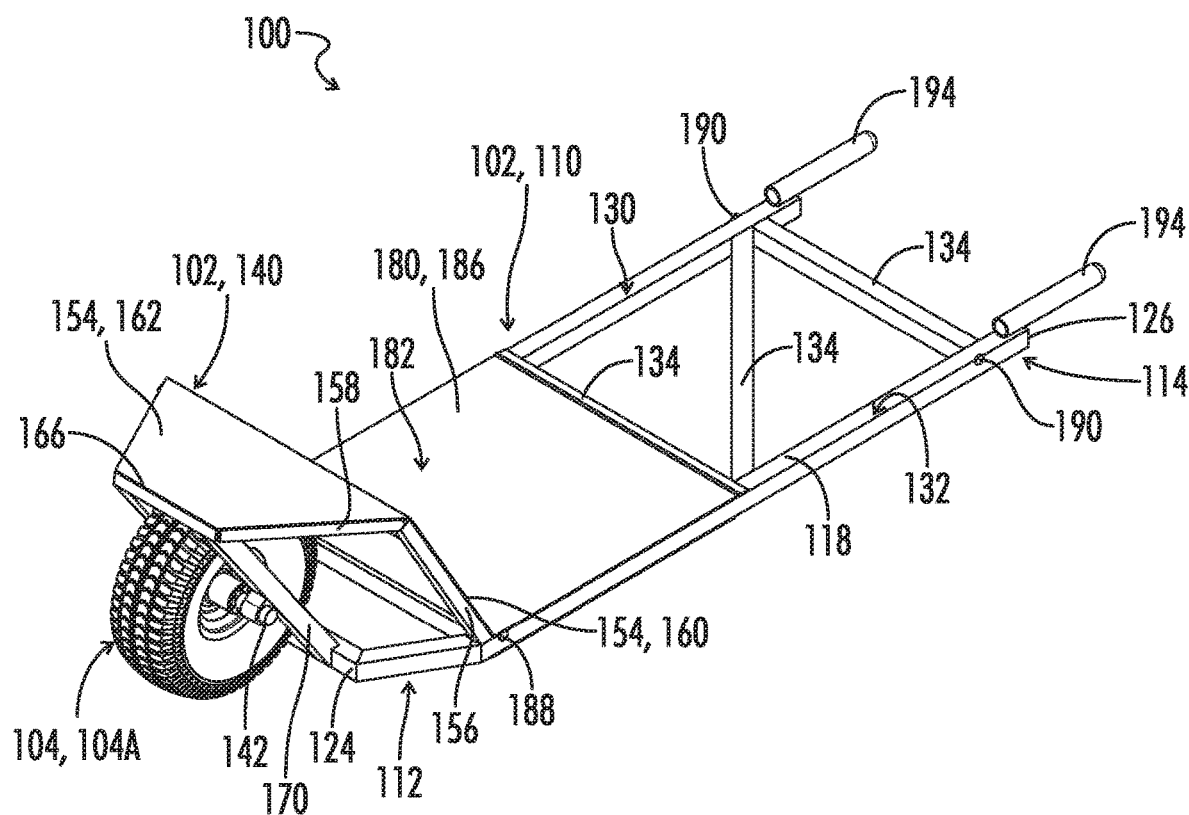
FIG. 4 illustrates a front perspective view of the cart of FIG. 1 in accordance with the present disclosure.
Figure 5:
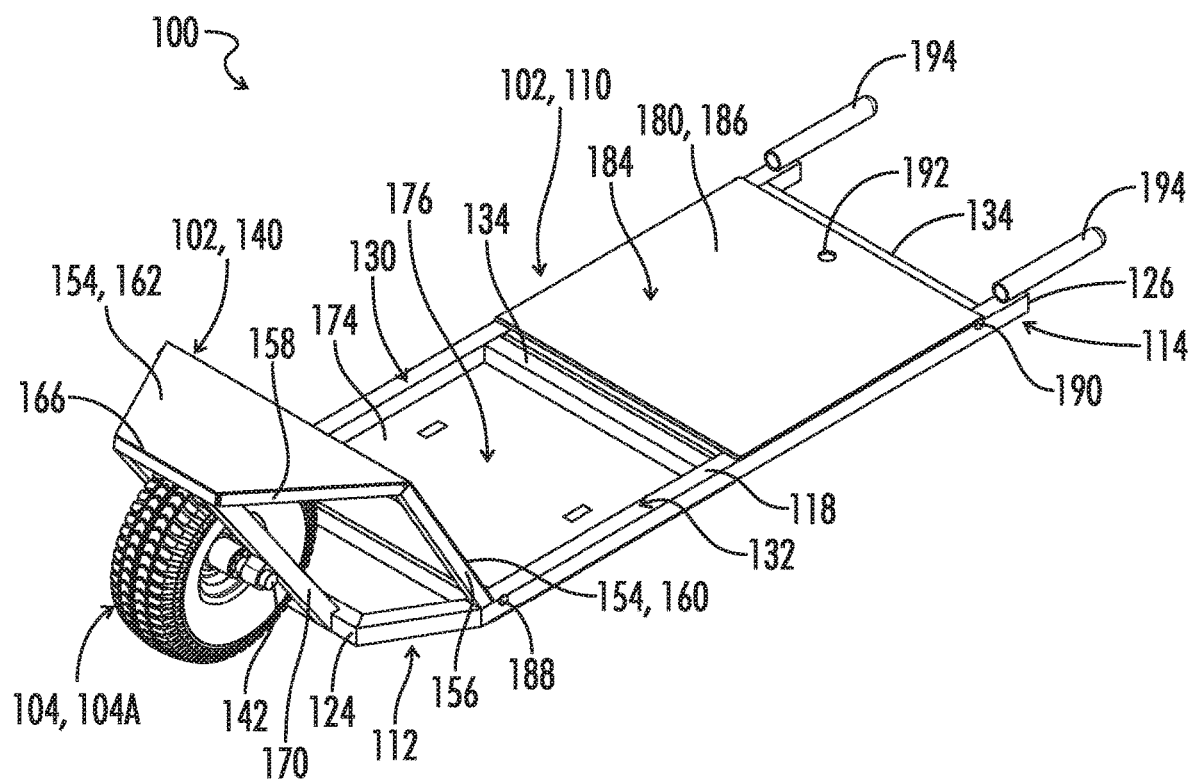
FIG. 5 illustrates a front perspective view of the cart of FIG. 2 in accordance with the present disclosure.
Figure 6:
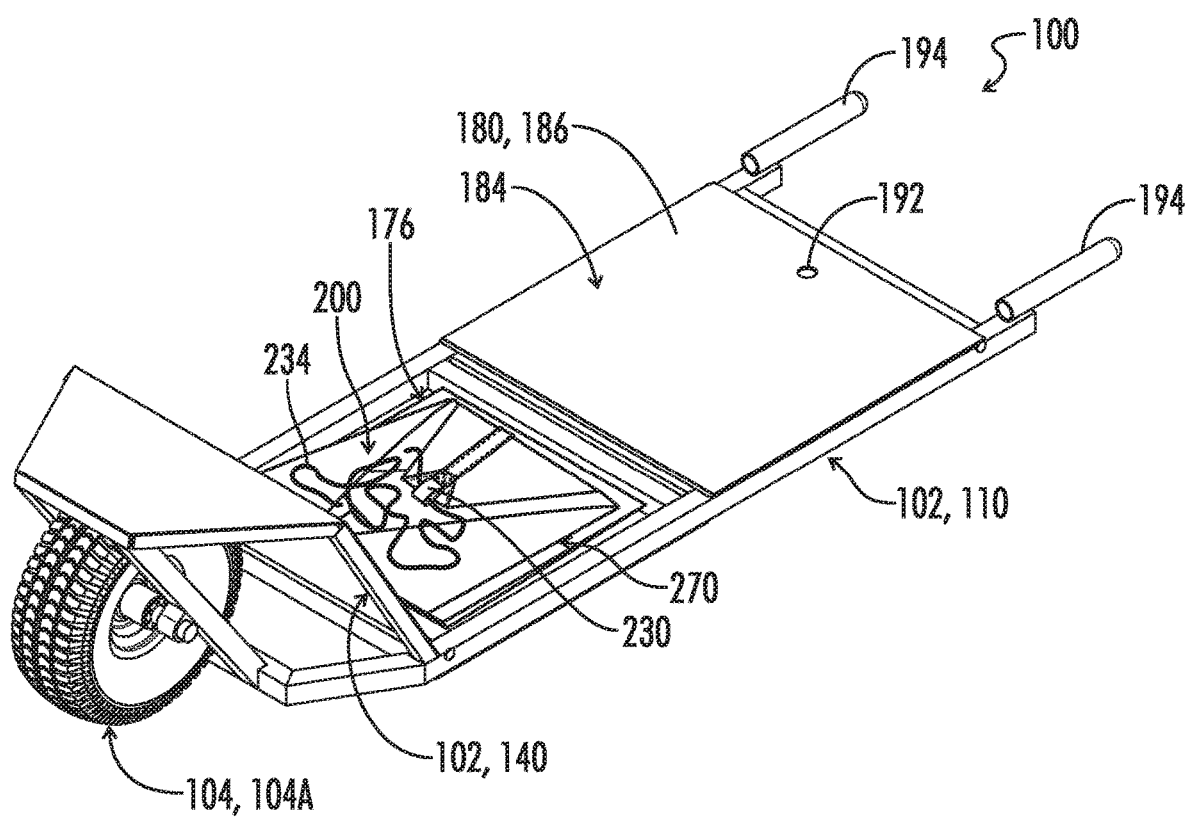
FIG. 6 illustrates a front perspective view of the cart of FIG. 5 with a tarp of the cart in a folded configuration in accordance with the present disclosure.

Referring to FIGS. 3, 6, and 13, the cart 100 may further include the tarp 200 connected thereto. The tarp 200 is configured to at least removably connect to the main support frame 110 of the cart 100. The tarp 200 may be connectable to the lower plate 174 of the main support frame 110 of the cart 100. As can best be seen in FIGS. 10-13, the lower plate 174 of the cart 100 may include one or more slots 178 defined through the lower plate 174 and configured to receive the one or more retainers 240 of the tarp 200. The one or more slots 178 of the lower plate 174 may also be referred to herein as at least one opening 178 of the lower plate 174. The one or more retainers 240 of the tarp 200 may hang down slightly below the lower surface 214 of the main support material 210 on the one or more reinforcement straps 220 such that one or more retainers 240 may be passed through the one or more slots 178 of the lower plate 174.

The storage compartment 176 is shown positioned nearer to the front end portion 112 of the main support frame 110 than to the rear end portion 114 of the main support frame 110. The tarp 200 is shown connected to the lower plate 174 of the main support frame 110. The center 232 of the main support material 210 of the tarp 200 may be located centrally within the storage compartment 176 when the tarp 200 is connected to the lower plate 174. In some embodiments (not shown), the tarp 200 may be connected to the upper plate 180 of the main support frame 110, similar to how the tarp 200 is shown connected to the lower plate 174 of the main support frame 110. In other embodiments (not shown), the storage compartment 176 may be positioned nearer to the rear end portion 114 of the main support frame 110 than to the front end portion 112 of the main support frame 110.

As can best be seen in FIG. 3, the tarp 200 is configurable in an open configuration 260 to rest on at least a portion of the topside 118 of the main support frame 110 and on at least a portion of the at least one surface 154 of the wheel support frame 140. The open configuration 260 of the tarp 200 may also be referred to herein as an open position 260 of the tarp 200. In the open configuration 260, the tarp 200 may cover a majority of the cart 100. The upper plate 180 of the main support frame may be configured in the second position 184 when the tarp 200 is in the open configuration 260. The tarp 200 when in the open configuration 260 may be configured to cover or rest on at least a portion of the upper surface 186 of the upper plate 180. Furthermore, the tarp 200 when in the open configuration 260 may be configured to cover or rest on at least a portion of each of the first and second sloped surfaces 160, 162 of the wheel support frame 140.

As can best be seen in FIG. 6, the tarp 200 is configurable in a folded configuration 270 to be stored in the storage compartment 176. The folded configuration 270 of the tarp 200 may also be referred to herein as a folded position 270 of the tarp 200. The tarp 200 may be configured in the folded configuration 270 when the upper plate 180 of the main support frame 110 is in the first position 182.

As can best be seen in FIG. 13, the tarp 200 is configurable in the closed configuration 250 using the tie rope 234 of the tarp 200, as discussed above. The closed configuration 250 of the tarp 200 may be utilized for holding debris (not shown) securely within the main support material 210 of the tarp 200. Although not shown, the closed configuration 250 of the tarp 200 may also be utilized for securing and transporting other items such as tools, excess leftover material, or the like. The tarp 200, when configured in the closed configuration 250, may make transporting debris or other items to and from a job site easier, safer, and more efficient when using the cart 100.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:
1. A multipurpose cart comprising:
 a substantially flat main support frame having a topside and an upper plate pivotally connected to the topside of the main support frame adjacent to a storage compartment;
 a wheel support frame extending from the main support frame and inclined upwardly relative to the main support frame, the wheel support frame including at least one surface extending along a rearward portion of the wheel support frame proximate to the main support frame and over an upper portion of the wheel support frame;
 at least one wheel rotatably connected to the wheel support frame; and
 a tarp selectively connectable to the main support frame, the tarp being configurable in an open position to rest on at least a portion of the topside of the main support frame and to rest on at least a portion of the at least one surface of the wheel support frame, and
 wherein the upper plate being configurable in either a first position or a second position to at least partially define an upper surface, the upper plate in the first position lays flat along a portion of the topside of the main support frame covering the storage compartment, and the upper plate in the second position lays flat along a portion of the topside of the main support frame adjacent to the storage compartment.

2. The multipurpose cart of claim 1, wherein the at least one surface of the wheel support frame includes:
 a first sloped surface extending from the topside of the main support frame along the rearward portion of the wheel support frame; and
 a second sloped surface connected to the first sloped surface and extending along the upper portion of the wheel support frame.

3. The multipurpose cart of claim 2, wherein:

the tarp is configured to rest on at least a portion of each of the first and second sloped surfaces of the wheel support frame in the open position.

4. The multipurpose cart of claim 1, wherein:

the main support frame further includes a first side rail and a second side rail spaced apart from the first side rail, the first and second side rails at least partially define the topside of the main support frame.

5. The multipurpose cart of claim 4, wherein:

the main support frame includes a lower plate connected between the first and second side rails, the lower plate spanning a portion of a length of the main support frame; and the lower plate, the first side rail, and the second side rail are configured to at least partially define a storage compartment of the main support frame, the storage compartment positioned above the lower plate between the first and second side rails.

6. The multipurpose cart of claim 5, wherein:

the tarp is connectable to the lower plate; and the tarp is configurable in a folded position to be stored in the storage compartment.

7. The multipurpose cart of claim 5, wherein:

the tarp includes at least one retainer extending from a bottom side of the tarp;

the at least one retainer is connected to the lower plate via at least one opening defined through the lower plate.

8. The multipurpose cart of claim 1, wherein:

the tarp is further configurable in a folded position when the upper plate is in the first position; and the tarp is configurable in the open position to rest on at least a portion of the upper surface of the upper plate when the upper plate is in the second position.

* * * * *